(12) United States Patent
Klotz et al.

(10) Patent No.: US 9,739,169 B2
(45) Date of Patent: Aug. 22, 2017

(54) FORMATION OF CORROSION-RESISTANT COATING

(71) Applicants: Brian Klotz, Perkasie, PA (US); Kevin Klotz, Spring City, PA (US)

(72) Inventors: Brian Klotz, Perkasie, PA (US); Kevin Klotz, Spring City, PA (US)

(73) Assignee: COATINGS FOR INDUSTRY, INC., Souderton, PA (US)

( * ) Notice: Subject to any disclaimer, the term of this patent is extended or adjusted under 35 U.S.C. 154(b) by 0 days.

(21) Appl. No.: 14/010,113

(22) Filed: Aug. 26, 2013

(65) Prior Publication Data

US 2013/0344318 A1 Dec. 26, 2013

Related U.S. Application Data

(63) Continuation of application No. 10/530,541, filed as application No. PCT/US03/31785 on Oct. 7, 2003, now abandoned.

(60) Provisional application No. 60/416,575, filed on Oct. 7, 2002.

(51) Int. Cl.
| | |
|---|---|
| *F01D 25/00* | (2006.01) |
| *C04B 28/26* | (2006.01) |
| *C04B 41/00* | (2006.01) |
| *C04B 41/50* | (2006.01) |
| *C04B 41/85* | (2006.01) |
| *C09D 1/02* | (2006.01) |
| *C09D 5/10* | (2006.01) |
| *C09D 5/24* | (2006.01) |
| *C23C 18/00* | (2006.01) |
| *C23C 18/12* | (2006.01) |
| *C23C 24/08* | (2006.01) |
| *C23C 26/00* | (2006.01) |
| *F02C 7/30* | (2006.01) |
| *C04B 111/00* | (2006.01) |
| *C04B 111/28* | (2006.01) |
| *C04B 111/34* | (2006.01) |
| *C04B 111/90* | (2006.01) |

(52) U.S. Cl.
CPC ............ *F01D 25/007* (2013.01); *C04B 28/26* (2013.01); *C04B 41/009* (2013.01); *C04B 41/5089* (2013.01); *C04B 41/85* (2013.01); *C09D 1/02* (2013.01); *C09D 5/103* (2013.01); *C09D 5/24* (2013.01); *C23C 18/00* (2013.01); *C23C 18/127* (2013.01); *C23C 18/1212* (2013.01); *C23C 18/1225* (2013.01); *C23C 18/1241* (2013.01); *C23C 18/1283* (2013.01); *C23C 24/08* (2013.01); *C23C 24/082* (2013.01); *C23C 24/087* (2013.01); *C23C 26/00* (2013.01); *F02C 7/30* (2013.01); *C04B 2111/00525* (2013.01); *C04B 2111/28* (2013.01); *C04B 2111/34* (2013.01); *C04B 2111/90* (2013.01); *F05D 2230/90* (2013.01); *F05D 2300/611* (2013.01); *Y02T 50/671* (2013.01); *Y10T 428/263* (2015.01)

(58) Field of Classification Search
CPC ......... F01D 25/007; C04B 28/26; C09D 1/02; B05D 5/00; C23C 26/00
USPC ......................................................... 427/375
See application file for complete search history.

(56) References Cited

U.S. PATENT DOCUMENTS

| | | | | |
|---|---|---|---|---|
| 2,576,845 | A | * 11/1951 | McDonald | 428/557 |
| 3,180,746 | A | 4/1965 | Patton et al. | |
| 3,812,022 | A | * 5/1974 | Rogers | 205/323 |
| 3,959,063 | A | * 5/1976 | Hawthorne | 156/325 |
| 3,998,779 | A | 12/1976 | Baer | |
| 4,219,358 | A | * 8/1980 | Hayashi et al. | 106/1.17 |
| 4,537,632 | A | * 8/1985 | Mosser | 106/14.12 |
| 4,917,960 | A | * 4/1990 | Hornberger et al. | 428/550 |
| 4,957,421 | A | 9/1990 | Baldi | |
| 5,433,976 | A | * 7/1995 | van Ooij et al. | 427/327 |
| 5,478,413 | A | * 12/1995 | Mosser et al. | 148/261 |
| 5,998,525 | A | * 12/1999 | Wang et al. | 524/425 |
| 6,156,452 | A | 12/2000 | Kozuki et al. | |
| 6,297,312 | B1 | * 10/2001 | Wang | 524/507 |
| 2002/0168477 | A1 | * 11/2002 | Savin | 427/397.8 |

FOREIGN PATENT DOCUMENTS

| | | | |
|---|---|---|---|
| EP | 295834 | A * | 12/1988 |
| EP | 2730679 | A1 | 5/2014 |

OTHER PUBLICATIONS

"Product Data—ALSEAL 505"; one page Published over one year prior to the effective filing date of U.S. Appl. No. 10/530,541, filed Apr. 6, 2005.

* cited by examiner

*Primary Examiner* — Nathan Empie
(74) *Attorney, Agent, or Firm* — Fox Rothschild LLP

(57) ABSTRACT

A coating process comprising applying to a surface a coating composition consisting essentially of an alkali metal silicate and an aqueous liquid phase having dispersed therein solid aluminum particles to form on the surface a wet coating; and drying said wet coating: under conditions which convert said wet coating to an electrically conductive, corrosion-resistant, solid coating; or under conditions which form a solid coating which is not electrically conductive (non-conductive) and thereafter treating said non-conductive coating under conditions which convert said non-conductive coating to an electrically conductive, corrosion-resistant coating.

40 Claims, No Drawings

FORMATION OF CORROSION-RESISTANT COATING

CROSS-REFERENCE TO RELATED APPLICATIONS

This application is a continuation of application Ser. No. 10/530,541, filed Apr. 6, 2005, which is the U.S. national stage of Application No. PCT/US03/31785, filed Oct. 7, 2003, which claims priority from U.S. Application No. 60/416,575, filed Oct. 7, 2002.

FIELD OF THE INVENTION

The present invention relates to the formation of a corrosion-resistant coating on a metallic surface. More particularly, the present invention relates to a silicate coating composition, to its use to form on a metallic surface a coating which is highly corrosion-resistant, and to a coated article having thereon a silicate coating which is highly corrosion-resistant.

The present invention will be described initially in connection with its use to form highly corrosion-resistant coatings on the surfaces of turbine engines, for example, airplane turbine engines and gas- or steam-powered ground turbine engines. It should be understood, however, that the present invention can be used also in other applications, as will be evident from the detailed description of the invention which appears below.

The operation of a turbine engine generates very high temperatures to which various parts of the engine are exposed. For example, the temperature in the combustion chamber of the engine can reach 2200° F. or higher. Other parts of turbine engines which are subjected to such high temperatures include, for example: stators; blades; discs; turbine shafts; and exhaust ducts.

The housing of a turbine engine and parts comprising the engine are made typically from specialty steels, for example, stainless steel and from high-strength, light-weight, titanium-based alloys. As is well known, iron-based metals tend to corrode (rust) in the presence of water and are weakened structurally as the rusting process progresses. Turbine engines and the parts thereof typically come into contact with water, for example, as moisture condenses on the various surfaces of the engine when the engine is not in use. Also, airplane turbine engines can come into contact with salt water which has a highly corrosive effect on iron-based parts. If the various surfaces of the turbine engine are not protected from contact with water, there can be engine failure as one or more of the parts lose strength due to the corrosive effect of the water.

Accordingly, it is well known to apply to the various surfaces of turbine engines coatings which protect the underlying metallic surfaces from contact with water and which function as corrosion-resistant coatings. Such coatings must withstand, of course, the high operating temperatures of the engine.

At the high operating temperatures of the engine, the various metallic surfaces of the engine, including those comprising iron-based and titanium-based alloys, are subject also to being oxidized, a reaction known as "heat oxidation". Parts of the engine which are vulnerable to heat oxidation include the combustion chamber, the power turbine and the exhaust chamber. Heat oxidation can result also in engine failure as parts of the engine are weakened structurally. Accordingly, the corrosion- and heat-resistant coating should function also to protect critical underlying metallic surfaces from being oxidized in the presence of the large amounts of heat generated by the operation of the engine.

For industrial acceptance, the coatings for use in such turbine engine applications must have also a combination of other properties, including, for example, flexibility properties, crack-resistant properties, hydraulic oil-resistant properties, and abrasion-resistant properties.

The present invention relates to the provision of a coating composition which is capable of forming on a metallic surface a highly corrosion-resistant coating that has a combination of properties of the type required for successful use in industrial turbine engine applications as well as other industrial coating applications.

SUMMARY OF THE INVENTION

In accordance with the present invention, there is provided a coating process comprising: (A) applying to a surface an aqueous coating composition consisting essentially of an alkali metal silicate and having dispersed therein solid aluminum particles to form on the surface a wet coating; and (B) drying said wet coating under conditions which convert said wet coating to an electrically conductive, solid corrosion-resistant coating or drying said wet coating under conditions which form a solid coating which is not electrically conductive (non-conductive) and thereafter treating said non-conductive coating under conditions which convert said nonconductive coating to an electrically conductive, corrosion-resistant coating.

In preferred form, the coating composition is substantially free of chromium. Also, in preferred form, the aluminum particles are dispersed in an aqueous solution of the alkali metal silicate. In addition, the preferred form of the coating composition includes one or more additives which are effective in improving the corrosion-resistant properties of the coating. An organic solvent and a silane are examples of such additives.

Another aspect of the present invention is the provision of a surface coated with an electrically conductive silicate coating comprising aluminum. In preferred form, a metallic surface is provided with a coating that has a thickness of about 0.8 mil to about 3.5 mils and corrosion-resistant properties characterized by no greater than about 1.6 mm loss of adhesion at scribe when subjected to 5% neutral salt spray at 95' F. for at least about 1000 hours (ASTM B-117).

There are numerous advantages that are associated with the present invention. Chromium-based coating compositions have been considered for many years as the standard in industry for forming coatings which are highly corrosion-resistant. The present invention enables one to form such highly corrosion-resistant coatings, but without the need to use environmentally detrimental constituents like hexavalent chromium. Another advantage of the composition of the present invention is that it is a "one-part" composition in that all of the constituents can be mixed together into a single formulation well prior to use and without one or more of the constituents affecting adversely other constituents of the composition. Non-chromium-based compositions of the prior art are typically "two-part" compositions which need to be mixed together just prior to use. Other advantages of the present invention are discussed below.

It is believed that the present invention will be used widely to coat and protect various types of surfaces, particularly the metallic surfaces of a turbine engine, including the housing and various parts of the engine.

DETAILED DESCRIPTION OF THE INVENTION

As set forth above, the present invention includes within its scope the provision of an electrically conductive, silicate coating which includes aluminum, which is highly corrosion-resistant, and which has other desirable properties, as discussed in detail below. As discussed below also, various of the desired properties of the conductive silicate coating are much better than those of a silicate coating which is non-conductive. The term "electrically conductive" means that the coating has an ohm value of no greater than about 20, preferably no greater than about 15, and more preferably less than about 10, as determined by the conductivity test which is described below in the text of Example 1 hereof.

The silicate component of the coating functions as a film-former and binder which binds together the other constituent(s) of the coating and the coating to the underlying substrate. The aluminum constituent of the coating imparts thereto sacrificial corrosion properties, that is, the aluminum reacts preferentially with materials which would tend to react with the underlying substrate and cause degradation thereof. This "sacrificial property" deters corrosion of the underlying substrate.

The electrically conductive silicate coating can be formed on the underlying substrate in any suitable way. In accordance with the present invention, it is recommended that the coating be formed initially as a wet coating from a liquid composition that contains an alkali metal silicate, aluminum particles, and water and that the wet coating be dried under conditions which convert the wet coating to an electrically conductive solid form or that the wet coating be dried under conditions which form a non-conductive solid coating which is then converted to an electrically conductive form. It should be appreciated that the conventional use of the aforementioned type of liquid silicate coating composition results in the formation of a coating which is non-conductive and which has properties, including corrosion-resistant properties, which are substantially poorer than the conductive form of the coating.

The corrosion-resistant coating of the present invention can be formed from an aqueous coating composition comprising an alkali metal silicate and aluminum particles dispersed therein. The composition can include also optional ingredients, as described below. As mentioned above, one of the advantages associated with the use of the composition is that it is not necessary to keep one or more of the constituents comprising the composition separated from another of the constituent(s) just prior to the time the composition is to be used. Other types of prior art compositions that have been used industrially to coat turbine engine parts include components which have a short "pot-life", that is, upon being mixed, the resulting composition has to be used in a relatively short period of time (for example, within about 1 hour to about 6 hours) or it becomes unusable for the coating application. Preferred compositions for use in the present invention are stable and indeed have a long shelf-life, for example, about 10 months or longer.

Alkali metal silicates are well known materials which are available in liquid form or solid form, for example in, powdered form. Any suitable alkali metal silicate can be used in the composition of the present invention. Examples of alkali metal silicates are sodium silicate, lithium silicate, and potassium silicate. A mixture of two or more alkali metal silicates may be used also. Preferred alkali metal silicates are sodium silicate and lithium silicate. It is preferred particularly to use a mixture of sodium silicate and lithium silicate.

Sodium silicate is used preferably in liquid form, for example, as an aqueous solution of glasses made by fusing varying proportions of sand and soda ash. The proportions of sand and soda ash that are used determine the $SiO_2:Na_2O$ weight ratio of the sodium silicate. For example, there are available commercially liquid (water-based) sodium silicates that have a $SiO_2:Na_2O$ weight ratio of about 1.6:1 to about 3.75:1 and that have viscosities which range from those of a syrupy liquid (for example, 1.8 poises at 20° C.) to a thick alkaline liquid (for example, 700 poises at 20° C.). A preferred liquid silicate has a $SiO_2:Na_2O$ weight ratio about 2.5:1 to about 3.2:1.

Examples of commercially available liquid sodium silicates include those sold by The PQ Corporation under the registered trademarks: "STIXSO RR"; N; E; O; K; M; RU; D; C; and STAR. Examples of powdered sodium silicates are those sold by The PQ Corporation under the registered trademarks "SS" 65 pwd; "G"; "GA"; and GD. Commercially available sodium silicates include those which comprise about 9 to about 27 wt. % $Na_2O$ and about 20 to about 75 wt. % $SiO_2$.

Any suitable lithium silicate can be used in the composition. The lithium silicate can be in solid or liquid form and have, for example, a $SiO_2:Li_2O$ weight ratio of about 9.4:1 to about 17:1, with the preferred ratio being about 9:1 to about 10:1. Examples of commercially available lithium silicates include Ludox® lithium polysilicate.

Any suitable potassium silicate can be used in the composition. The potassium silicate can be in solid or liquid form and have, for example, a $SiO_2:K_2O$ weight ratio of about 1.6:1 to about 2.5:1. Examples of commercially available liquid potassium silicates those sold by The PQ Corporation under the registered trademark KASIL.

The alkali metal silicate should be used in the composition in an amount at least sufficient to form a continuous adherent coating on the surface of the substrate and to bind the aluminum particles which are included in the coating. The maximum amount of alkali metal silicate comprising the coating composition is dictated by the ability to bond the aluminum particles to the surface without the coating's blistering or mud cracking as it is cured. It is believed that the most widely used compositions will comprise about 2.5 to about 30 wt. % of the alkali metal silicate. Preferably, the composition comprises about 7 to about 13 wt. % of the alkali metal silicate.

In the use of a mixture of sodium silicate and lithium silicate, it is recommended that the sodium silicate:lithium silicate weight ratio be about 0.25:1 to about 4:1, with the preferred ratio being about 0.6:1 to about 1.5:1. In the use of a mixture of sodium and lithium silicates, it is recommended that the composition comprise a total silicate content of about 2.5 wt. % to about 30 wt. %, with the preferred amount being about 7 wt. % to about 13 wt. %.

The composition of the present invention includes also solid aluminum particles, for example, in the form of flake, powder, or granules. It is preferred that the aluminum particles be in the form of a powder. The aluminum particles should be of a size sufficiently small to enable the particles to be dispersed in the liquid composition, preferably uniformly throughout the composition. For dispersiblity, it is preferred that the average size of the aluminum particles be no greater than about 15 microns. Typically, the average size of the aluminum particles should be about 2 microns to about 10 microns. A particularly preferred average particle size is about 4 microns to about 7 microns. Examples of commercially available aluminum particles include Toyal America 105 and Toyal America 5662.

The aluminum particles should be used in the composition in an amount such that the coating can be made conductive. The maximum amount of aluminum particles comprising the composition is governed by sprayability considerations and coating defects which tend to be encountered if too much aluminum is used, loss of adhesion and surface defects in the coating such as mud cracking. It is believed that the most widely used compositions will comprise about 20 to about 50 wt. % of the aluminum particles. Preferably, the composition comprises about 35 to about 45 wt. % of the aluminum particles.

Optional materials can be included in the aqueous composition in amounts effective to achieve desired effects. Examples of optional materials are wetting agents, phosphates, fluorocarbons, polysiloxanes, water repellants, rheology modifiers, and nanopowders.

Any suitable wetting agent can be used in the composition. The wetting agent should function to modify the surface characteristics of the substrate being coated in a manner such that the uniform application of the water-based coating composition is more readily achieved and the tendency of surface defects to form in the coating is reduced. Examples of suitable wetting agents that can be used and include anionic, nonionic, cationic, and amphoteric wetting agents. Preferred classes of wetting agents are silanes, fluoropolymer type wetting agents, polysiloxanes, and phosphates. Preferred species of wetting agents are Lodyne S222 fluorocarbon, Byk 348 polysiloxane, Zonyl FSN fluorocarbon, Coat-O-Sil 1211 silane, Cirrasol G-2200 alkyl phosphate. The wetting agent can comprise about 0.05 wt. % to about 1 wt. %, preferably about 0.05 wt. % to about 0.2 wt. % of the composition.

Addition of a phosphate containing compound (either organic or inorganic) may be used to improve various coating properties, for example, adhesion to the underlying substrate and flexibility. It has been observed, however, that the presence of a phosphate may improve certain properties at the expense of affecting adversely other properties. For example, flexibility of the coating can be improved by the use of phosphate in the coating composition, but a decrease in corrosion-resistance can be experienced. Examples of sources of phosphate, which include water soluble phosphates, are trisodium phosphate, sodium tripolyphosphate, ferric pyrophosphite, sodium pyrophosphate (particularly preferred), ammonium phosphate, and tributyl phosphate (preferred). Typically, the phosphate can comprise about 0.1% to about 2.5 wt. % of the total composition, with the preferred range being about 0.2% to about 1 wt. %.

Including in the coating composition a compound which is generally referred to in the art as an "organic solvent" can reduce or prevent the formation of surface blisters in the coating. The formation of surface blisters has been observed, for example, as the corrosion-resistant properties of multiply coatings have been evaluated in salt spray tests. Blisters have an adverse effect on the corrosion-resistant properties of the coating and their formation in coatings used in industrial applications would be undesirable. It has been observed also that the use of the organic solvent improves the ability of the composition to be applied more readily and uniformly to the substrate and to form smooth coatings.

The organic solvent is a liquid at room temperature and has surface active properties, but differs from a wetting agent, as described above, in that the solvent is 100% volatile and is capable of dissolving another substance and, in some cases, can be used to help dissolve a wetting agent when used and as needed. The organic solvent is also typically used at a higher percentage compared to a wetting agent. The organic solvent can be used, for example, at a level of 2% by weight or higher for beneficial effects, whereas the effectiveness of a wetting agent can be realized at concentrations of 1% or lower. The organic solvent should be a compound which is compatible with the other constituents of the aqueous coating composition. For example, the addition of the solvent to the coating composition should not cause precipitation of the silicate constituent or other constituents of the composition. A preferred group of organic solvents for use in the present composition comprises a solvent which is partially miscible in water, that is, the solvent has a miscibility in water of about 1 ml to about 20 ml of solvent per 100 ml of water at about 20° C. An aqueous composition which includes an organic solvent that has a lower degree of miscibility with water is evidenced by the formation of a layer of a solution of the water and organic solvent (the miscible layer) and a layer of the organic solvent. More preferably, the partially water-miscible organic solvent is miscible in water up to about 10 ml and, most preferably, up to about 5 ml of solvent per 100 ml of water at about 20° C. The solvent may have a miscibility of about 0.1 ml/100 ml of water (or even lower) at 20° C. Accordingly, the solvent may be immiscible in water.

Partially water-miscible organic solvents for use in the practice of the present invention are liquid aliphatic and aromatic carbon compounds which have typically a hydrophilic group, for example, an ether group, most typically a hydroxyl (—OH) group. Examples of classes of compounds which include such solvents are glycols, glycol ethers, ketones, esters, and alcohols. A glycol ether is a preferred class of compounds, for example, propylene glycol n-butyl ether. A particularly preferred glycol ether is dipropylene glycol n-butyl ether.

The organic solvent should be included in the composition in an amount sufficient to reduce the formation of blisters in the coating in those applications in which they tend to form. It is believed that, for most applications, the amount of solvent will fall within the range of about 0.5 to about 10 wt. % of the composition. Preferably, the composition comprises about 4 to about 6 wt. % of the solvent.

It is theorized that mechanisms involved in the functioning of the solvent to reduce blister formation are as follows. The presence of the solvent in the composition is believed to change the rate of evaporation of the water constituent; this causes the silicate to polymerize and precipitate (solidify) in a different manner than when the solvent is not present. This, in turn, leads to the formation of coatings that are more resistant to being degraded by high moisture conditions. It is believed also that the solvent functions to wet both the surfaces of the substrate being coated and the aluminum particles; this aids in the formation of a cured coating which has improved bonds that tightly adhere to the underlying surface and retain their integrity, even in the presence of high moisture conditions.

Another additive that can be included in the coating composition to reduce or prevent the formation of surface blisters in the coating is an organofunctional silane. It has been observed that the use of such a silane improves also surface wetting, adhesion, and moisture-resistance in the cured coating. The silane can be used in admixture with the organic solvent.

Many species of organofunctional silanes are known. For example, the following publications disclose species of such silanes and contain also a substantial amount of information on organofunctional silanes: (A) Organ® Silicon, Products Systems—Services, Product Information, Union Carbide Organofunctional Silanes for Coatings, SC-1603B, Union Carbide Corporation, Specialty Chemicals, Danbury, Conn. (1993); (B) Silquest® Silanes Products and Applications, Witco Corporation, Greenwich, Conn.; (C) Silquest Organofunctional Silanes for Waterborne Systems, Adhesion Promoters and Crosslinkers, OSi Specialites, Inc.; (D) Silquest A-1123 Silane, Low Chloride Adhesion Promoter and Crosslinker, OSi Specialties, Inc.; and (E) Organofunctional Silanes, PO-2266, SC-1294, December 1991, OSi Specialties, Inc.

Speaking generally, an organofunctional silane comprises a functional moiety that contains an Si atom and an organic moiety connected to the Si atom. The functional Si-containing moiety is capable of hydrolyzing in the presence of water to form a silanol (—Si(OH),) which in turn is capable of reacting with, for example, reactive sites on inorganic surfaces, for example, metallic surfaces and surfaces of pigment particles. The silanol is capable also of co-condensing to effect crosslinking of polymers through a moisture-cure mechanism.

Organofunctional silanes can be grouped into two classes, namely, organoreactive organofunctional silanes and non-organoreactive organofunctional silanes (hereafter, for convenience "organoreactive silanes" and "non-organoreactive silanes" respectively). These classes are described hereafter.

The organoreactive silane contains in its organic moiety a functional group that is capable of reacting with one or more functional groups on a polymer or on a monomer for use in polymerization. Examples of reactive functional groups that are present in organoreactive silanes are vinyl, methacryl, epoxy, mercapto, amino, ureido, and isocyanato. The organoreactive silanes are described for use in a variety of applications, for example, in polymer synthesis as chain transfer, end-blocking, and crosslinking agents. In addition, they are known to be used in polymer-based coating or paint compositions where they combine chemically with the polymeric binder of the composition to improve a variety of properties in coatings formed from the compositions. Such properties include, for example, coating strength, adhesion, durability, weather-resistance, scrub-resistance, and mar- and abrasion-resistance.

The non-organoreactive silane has an organic moiety which is non-reactive with constituents that are present in the environment of its use. Non-organoreactive silanes are reported as being useful in improving the dispersion of pigment and filler and various properties of coating compositions in which they are used and coatings formed from the coating composition. Examples of such properties include ease of mixing and improved gloss, hiding power, and water-resistance of coatings formed from compositions that contain the silane.

A silane for use in the practice of the present invention can be represented by the formula $Rn—Si(X)_{4-n}$ in which R represents either an organic moiety that contains a reactive functional group, as described above, or an organic moiety that is not reactive, as described above. X represents an alkoxy group, for example, methoxy, ethoxy, and acetoxy. Examples of reactive functional groups that can be included in the organic moiety (R) are identified above in connection with the general description of the organoreactive silanes. Examples of the organic moiety (R) in the non-organoreactive silanes are alkyl and phenyl.

Silanes for use in the practice of the present invention can be represented also by the following formula:

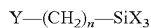

in which: Y is an organic moiety that is attached to the silicon atom by a stable $(CH_2)n$ carbon chain and that contains a reactive group, for example, —Cl, —NH$_2$, —SH, —CH=CH$_2$—, —OC—C(CH$_3$)=CH$_2$, —N=C=O, and

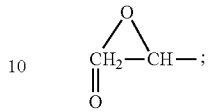

X is a functional group that is capable of hydrolyzing and reacting with active sites on inorganic surfaces, for example, —OCH$_3$, —OC$_2$H$_5$, and —OC$_2$H$_4$OCH$_3$.

Examples of species of nonorganoreactive silanes include hexadecyltrimethoxysilane and methyltriethoxysilane.

The preferred silane for use in the practice of the present invention is an organoreactive silane. In particularly preferred form, the organoreactive silane includes in its organic moiety one or more of an amino or epoxy group, for example, gamma-aminopropyltriethoxysilane. Particularly preferred species of organoreactive silanes are N-beta-(aminoethyl)-gamma-aminopropyltrimethoxysilane and gamma-glycidoxypropyltrimethoxysilane.

The organofunctional silane should be included in the composition in an amount sufficient to reduce the formation of blisters in the coating in those applications in which they tend to form. It is believed that, for most applications, the amount of silane will fall within the range of about 0.1 to about 5 wt. % of the composition. Preferably, the composition comprises about 1 to about 3 wt. % of the silane.

It is theorized that mechanisms involved in the functioning of the snail e to reduce blister formation are as follows. It is believed that the silane functions to make the coating more insoluble to water in that it causes the silicate to precipitate in a different manner than when the silane is not present. It is believed also that the silane aids in the wetting of the substrate and the aluminum particles. The silane may act also as a coupling agent, helping to bond the coating to the substrate, as well as reacting onto the backbone of the silicate structure to form a less water-soluble, silicate-based polymer.

The amount of water comprising the aqueous-based silicate composition is generally dictated by viscosity needs, sprayability, and the amount necessary to allow the coating to cure without blistering. For most applications, it is believed that the water content of the composition will comprise about 35 to about 70 wt. % of the composition, with an amount of about 45 to about 55 wt. % being preferred.

An important advantage of the present invention is that the pH of the aqueous-based silicate composition is such that it does not degrade the aluminum particles or the metallic surface, for example, mild steels, which tend to be attacked or degraded by other types of coating compositions that are relatively acidic. The pH of the coating composition is dictated generally by the amount of silicate in the composition and the SiO$_2$:M$_2$O ratio. Typically, the pH of the composition will be about 10 to about 14, with a pH of about 11.5 to about 12.5 being preferred.

As mentioned above, the silicate coatings of the present invention can be formed from a coating composition that comprises environmentally acceptable constituents. Accordingly, the coatings of the present invention are capable of being formed from coating compositions which do not contain hexavalent chromium.

The coating composition can be applied to the surface of the substrate being coated in any suitable way, for example, dipping, spraying, brushing, and rolling. The amount of composition applied to the surface will depend on the thickness of the coating to be formed on the substrate. An exemplary coating thickness is about 1 to about 3 mils.

After the liquid coating composition is applied to the substrate, the resulting liquid coating should be allowed to dry and solidify (cure). This involves typically the evaporation of the water constituent of the composition and can include also a chemical setting mechanism, for example, treating the coating with ZnO, CaO, or an acidic wash. Curing the wet coating utilizing conventional curing methods, for example, by drying the wet coating at room temperature or at a relatively low elevated temperature, for example, about 250 to about 600° F. results in a solidified coating that is not electrically conductive.

In one embodiment of the invention, an electrically conductive coating can be obtained directly by curing the wet coating at a relatively high temperature. The particular temperature used will depend on various factors, including, for example, the thickness of the coating, the amount of aluminum in the coating, and type of aluminum, and the particle size of the aluminum Also, the lower the temperature, the longer the coating needs to be subjected to the elevated temperature. From a practical standpoint, the curing temperature should be at least about 950° F. For guideline purposes, it is noted that electrically conductive coatings have been achieved by curing the coating at a temperature of about 1000° F. for about 1 hour. Higher temperatures can be used. The maximum curing temperature is dictated typically by the temperature at which the aluminum will change to aluminum oxide in air. It is believed that at such elevated temperatures and curing conditions, the aluminum particles of the coating expand and the expanded particles contact one another more intimately and to the extent that the electrical conductivity of the coating is improved and converted to a conductive coating, as defined herein.

Preferably, multi-stage curing conditions are used, that is, curing is effected initially for a time and at a temperature which accelerates evaporation of the water in the coating, but which does not result in any loss of the water of hydration of the alkali metal silicate, for example, for about 15 minutes at 175° F. After the coating has cured to the extent that all of the free water has evaporated, the temperature can be raised to accelerate the cure further, such temperature being, for example, about 1000° F. and for a period of time of, for example, about one hour. The multi-stage curing deters the formation of coating defects which tend to be formed as a result of the surface of the coating's curing before all free water has been released.

In a preferred embodiment of the invention, an electrically conductive coating is obtained indirectly. This involves curing the wet coating at a relatively low temperature, for example, about 400 to about 650° F. for about ½ hour to about 1 hour to form a solid coating that is not electrically conductive. In a particularly preferred embodiment, multi-stage curing conditions are used, for example, an initial stage involving drying at a temperature of about 175° F. for 15 minutes and thereafter at 600° F. for about 30 minutes. Such non-conductive coating can be converted to an electrically conductive coating by subjecting the coating to conditions which are effective in compressing the coating to decrease the distance between the aluminum particles and force the particles into more intimate contact with one another and with the substrate. This can be accomplished, for example, by peening or burnishing the non-conductive coating. Burnishing the coating is preferred, for example, by blasting the coating with a material which is effective in performing said compression. Examples of such materials are AL2O3 grit (240 mesh), glass beads, and any other suitable media which is used in commercial blasting equipment. Burnishing the coating may be achieved also by tumbling or vibrating the coated article in the presence of a material which is effective in performing said compression and/or peening, for example, ceramic beads, other forms of ceramic, and steel media. Subjecting the coating to compressive and/or peening forces should be carried out for a period of time sufficient to convert the coating to an electrically conductive form. Exemplary time periods for achieving this are about 30 seconds to about 30 minutes.

The coating composition of the present invention can be used to form corrosion-resistant coatings on any suitable surface including, for example, metallic surfaces such as stainless steel, low-grade steel, and other iron alloys, titanium-based alloys, and aluminum and aluminum alloys. It is believed that the present invention will be used widely 'to form corrosion-resistant coatings on the surfaces of parts of airplane and ground turbine engines. Other exemplary applications for the use of the present invention are the coating of fasteners, exhaust headers, turbochargers, other engine components that are subjected to high temperatures, heat exchangers, and burner components. An example of a non-metallic surface on which the electrically conductive coating can be formed is a ceramic surface.

The thickness of the coating that is formed on the surface of the article should be at least sufficient to form a coating that has the desired corrosion-resistant properties. It is believed that, for most applications, the thickness of the coating will be about 1 mil to about 4 mils. For applications which involve a higher degree of corrosion protection, it is recommended that the coating thickness be about 2 to about 3.5 mils.

Multiple coats of the coating composition can be applied to the substrate to form a multi-ply coating, typically a two-ply coating. In forming a multi-ply coating, the underlying ply can be converted to an electrically conductive form prior to applying the overlying coating or the underlying coating can be left in its nonconductive form and coated with the overlying coating. In each of such embodiments, the overlying coating is treated in accordance with the present invention to convert it into an electrically conductive coating.

There have been circumstances where the formation of surface blisters has been encountered in the production of a multi-ply coating. (Blister formation has been observed in a multi-ply coating which has been dried and/or cured at elevated temperatures, as described above, and which has been subjected to salt spray tests for evaluation.) In such a circumstance, the following is a recommended procedure. After applying an underlying layer of wet coating composition to the substrate, the wet layer is air-dried before the application thereto of an overlying layer of coating composition, that is, the underlying layer of wet coating composition is not subjected to elevated temperature(s) to accelerate the drying and/or curing thereof. After applying to the air-dried underlying coating a layer of the overlying coating, the resultant multi-ply coating is subjected to elevated temperature(s) to dry and cure the multi-ply coating in the manner described above. This appears to cause the underlying layer of air-dried coating and overlying layer of wet coating to fuse together and cure at the same time. The formation of blisters in the overlying cured coating can be prevented by following this procedure.

In preferred form, the coating is formed on a grit blasted clean iron alloy surface and has a thickness of about 0.8 mil to about 3.5 mils and corrosion-resistant properties characterized by no greater than about 16 mm loss of adhesion at scribe when subjected to 5% neutral salt spray at 95° F. for about 1000 hours (ASTM B-117).

EXAMPLES

The following is an example of a coating composition for use in the present invention. Unless indicated otherwise, "%" means weight percent based on the total weight of the composition.

Example No. 1

| Constituents | Wt. % |
|---|---|
| Sodium silicate, wt. ratio $SiO_2:Na_2O$ - 3.22 | 11.6 |
| aluminum powder, average particle size 4.5 microns sold by Toyal America as No. 105 | 43 |
| water | 45.4 |

The source of the sodium silicate was a thick liquid (viscosity of 20° C.-4.0 poises) which is sold by The PQ Corporation under the trademark "O" and which comprises 9.15% $Na_2O$, 29.5% $SiO_2$, and 61.35% water. Additional water was added to the liquid sodium silicate to adjust the total water content of the composition to 45.4% and the resulting mixture was stirred for about 5 minutes to mix completely the sodium silicate. Next, the aluminum powder was added to the mixture and stirred therein for about 10 minutes to form 19 ml of an aqueous silicate solution having dispersed uniformly therein the aluminum powder. The resulting coating composition was applied to 1010 steel panels (3"×5"×0.03") by spray application with conventional air-spray equipment until a uniform wet coating of the desired thickness was obtained.

The wet coating formed from the coating composition was then air dried until dry to the touch and then further cured at a temperature of 175° F. for 15 minutes followed by 600° F. for 30 minutes. Curing of the wet coating resulted in a solid coating which had a thickness of 2 mils and which was determined to be non-conductive in that it has an ohm reading of greater than 20 ohms. The conductivity (or lack thereof) of the cured coating was determined by measuring the resistance of the coating in ohms using an ohmmeter with 2 blunt probes. The 2 probes are lightly placed one inch apart on the cured coating so as not to penetrate the surface of the coating. A reading of no greater than about 20 ohms is considered conductive.

The non-conductive coating (greater than about 20 ohms) was burnished in order to convert it into a coating that was electrically conductive by burnishing for about 1 minute with 240 mesh aluminum oxide grit at 40 psi in a suction blast cabinet. The conductivity of the burnished coating was measured and determined to have an ohm reading of 2.5 ohms. Accordingly, the coating was conductive. The conductivity of the burnished coating was evaluated in the same way as that of the aforementioned non-conductive coating.

The electrically conductive coating was then evaluated for: corrosion-resistance; adhesion; flexibility; abrasion-resistance; and hydrolytic stability. The tests used to evaluate such properties are described below:

(A) corrosion-resistance: ASTM B-117 salt spray test involving placing a coated article having an "x" scribed on the coating into an environmental- and temperature-controlled chamber and subjecting the coated article to a 5 wt. % neutral NaCl salt water spray at 95° F. for a predetermined number of hours;

(B) adhesion and flexibility: bend test involving bending a coated metal panel at 90° around a ¼ inch mandrel, then attempting removal of the coating by applying 3M #250 tape at the bend and thereafter removing the tape quickly;

(C) abrasion-resistance: ASTM D968-81 falling sand test involving dropping sand onto a coated article at a rate of 2 liters of sand in 21 to 23.5 seconds; and (D) hydrolytic stability: boiling water test involving immersing a coated metal panel in boiling water for a period of 10 minutes, removing it from the water, allowing it to air dry and cool for at least 1 hour at room temperature, and then subjecting it to the above bend test.

The results of testing various samples of panels coated as described above are set forth below.

| Properties Evaluated | Test Results |
|---|---|
| corrosion-resistance | 2000 hours with no signs of corrosion in scribed "x" or on face of article |
| adhesion and flexibility | pass, with no coating loss or cracking |
| abrasion-resistance | pass, 0.001 inch coating thickness loss for 300 liters of sand |
| hydrolytic stability | pass, with no coating loss or cracking |

The following examples describe coating compositions which can be used in the practice of the present invention. In all of the examples herein, the average particle size of the aluminum powder is about 4.5 microns and the pH of each of the exemplary compositions is within the range of 10 to 14.

Example No. 2 below comprises a coating composition which includes phosphate.

Example No. 2

10 g of aqueous solution of sodium silicate, "O" (The PQ Corporation)

9 g of $H_2O$ 0.13 g of tributyl phosphate 0.06 g of silicone wetting aid (to help emulsify the tributyl phosphate in water)

14.4 g of aluminum powder

The next example comprises a coating composition which also includes phosphate (but from a different source than the phosphate used in the composition of Example No. 2).

Example No. 3

10 g of aqueous solution of sodium silicate, "STAR" (The PQ Corporation)

9.65 g of $H_2O$ 0.25 g of sodium pyrophosphate aluminum powder at a ratio of 9 g to 10 ml of above ingredients The next example comprises a coating composition which includes a mixture of sodium and lithium silicates and which also contains phosphate.

Example No. 4

5 g of aqueous solution of lithium polysilicate, "48" (DuPont)

5 g of aqueous solution of sodium silicate, "STAR" (The PQ Corporation)

10 g of $H_2O$ 0.5 g of sodium pyrophosphate aluminum powder at a ratio of 9 g to 10 ml of above ingredients The next example comprises a coating composition which includes a wetting agent and a mixture of sodium and lithium silicates.

Example No. 5

5 g of aqueous solution of sodium silicate, "STAR" (The PQ Corporation)
10 g of water
5 g of aqueous solution of lithium silicate, "48" (Dupont)
Aluminum powder in an amount of 16.2 g was added to 18 ml of the above liquid composition and 0.27 g of Coat-O-Sil 1211 silane wetting agent was added also and the composition was then mixed. The resulting composition was well suited for application by spraying.

In the examples which follow, "%" means weight percent. The next example shows the use of a coating composition which contains an organic solvent and the use of the composition to form a multi-ply coating.

Example No. 6

16.9% of sodium silicate, "STAR" (The PQ Corporation)
14.2% of lithium silicate, "Ludox Lithium Silicate" (Grace Davidson Co.)
19.5% of $H_2O$
5.4% of dipropylene glycol n-butyl ether-organic solvent
44.0% of aluminum powder, "ATA 105" from Toyal America The source (STAR) of the sodium silicate comprised 10.6% $Na_2O$, 26.5% $SiO_2$, and 62.9% water. The source (Ludox, previously sold as "48 Dupont") of lithium silicate comprised 2.1% $Li_2O$, 20% $SiO_2$, and 77.9% water. A mixture of the sodium silicate, lithium silicate, and water was stirred for 5 minutes to completely mix the silicates. Next, the dipropylene glycol n-butyl ether was added to the mixture with stiffing and the resulting mixture was stirred for another 5 minutes. The aluminum powder was then added to the mixture and stirred therein for about 10 minutes to form an aqueous silicate solution having dispersed uniformly therein aluminum powder. The resulting coating composition was applied to 1010 steel panels (3"×5"×0.03") by spray application with conventional air-atomizing paint spray equipment until a uniform layer of wet coating was obtained.

The coating was allowed to air dry at ambient conditions (24° C. and 50% R.H.) for a minimum of one hour. A second coat of the coating composition was then applied to form a uniform overlying layer of wet coating. The multi-ply coating was allowed to dry to the touch at ambient conditions and was then placed in an oven at 175° F. for 20 minutes, followed by heating for 30 minutes at 650° F. Curing of the multi-ply coating resulted in a solid coating which had a thickness of 2.4 mils and which was determined to be non-conductive in that it had an ohm reading of greater than 20 ohms. The cured multi-ply coating was then made electrically conductive in the same manner as the coating of Example No. 1.

| Property Evaluated | Test Results |
| --- | --- |
| corrosion-resistance | 1000 hours with no signs of corrosion in scribed "x" or on face of article and no blisters (ASTM B-117) |

The next example shows the use of a coating composition which contains a silane and the use of the composition to form a multi-ply coating.

Example No. 7

16.2% of sodium silicate, "STAR" (The PQ Corporation)
13.6% of lithium silicate, "Ludox Lithium Silicate" (Grace Davidson Co.)
22.6% of $H_2O$
1.5% of N-beta-(aminoethyl)-gamma-aminopropyltrimethoxysilane, "Silquest A-1123" (OSi Specialties, Inc.)
46.7% of aluminum powder, "ATA 105" from Toyal America The description of the sodium silicate and lithium silicate is given above in Example No. 6. The mixture of sodium silicate, lithium silicate, and water was stirred for 5 minutes to completely mix the silicates. Next, the gamma-aminopropyltriethoxysilane was added to the mixture with stirring and stirring was continued for another 5 minutes. The aluminum powder was then added to the mixture and stirred therein for about 10 minutes to form an aqueous silicate solution having dispersed uniformly therein aluminum powder. The resulting coating composition was applied to 1010 steel panels (3"×5"×0.03") by spray application with conventional air-atomizing paint spray equipment until a uniform layer of wet coating was obtained.

The coating was allowed to air dry at ambient conditions (24° C. and 50% R.H.) for a minimum of one hour. A second coat of the coating composition was then applied to form a uniform overlying layer of wet coating. The multi-ply coating was allowed to dry to the touch at ambient conditions and was then placed in an oven at 175° F. for 20 minutes, followed by heating for 30 minutes at 650° F. Curing of the multi-ply coating resulted in a solid coating which had a thickness of 2.4 mils and which was determined to be non-conductive in that it had an ohm reading of greater than 20 ohms. The cured coating was then made electrically conductive in the same manner as the coating of Example No. 1.

| Properties Evaluated | Test Results |
| --- | --- |
| corrosion-resistance | 1000 hours with no signs if corrosion inscribed "x" or on face of article and no blisters (ASTM B-117) |

The next example describes a coating composition which includes a silane different from the silane used in Example No. 7.

Example No. 8

16.3% of aqueous solution of sodium silicate, "N" (The PQ Corporation)
13.0% of aqueous solution of lithium silicate, "48" (Dupont, now Ludox)
22.8% of $H_2O$
2.5% of Silquest A187 (gamma-glycidoxypropyltrimethoxysilane)
45.4% of aluminum powder.

Particularly preferred coating compositions are described below in Example Nos. 9 and 10, each of which contains a preferred wetting agent.

Example No. 9

16.9% of aqueous solution of sodium silicate, "N" (The PQ Corporation)
13.5% of aqueous solution of lithium silicate, "48" (Dupont, now Ludox)
23.7% of $H_2O$
0.5% of polyether modified poly-dimethyl-siloxane wetting agent, "bYK 348" (BYK Chemie)
45.4% aluminum powder Example No. 10

17.4% of aqueous solution of sodium silicate, "STAR" (The PQ Corporation)
14.5% of aqueous solution of lithium silicate, "48" of (Dupont, now Ludox)
19.9% of $H_2O$
2.64% of dipropylene glycol n-butyl ether solvent
0.36% of polyether modified poly-climethyl-siloxane wetting agent, "bYK 348" (BYK Chemie)
45.2% of aluminum powder It should be appreciated from the above description that the present invention provides an environment ally compatible composition that is capable of forming in a convenient fashion a highly corrosion-resistant coating that protects underlying substrates from being degraded even under the most severe of conditions, for example, those encountered in the operation of turbine engines.

The invention claimed is:

1. A coating process comprising: (A) applying to a metallic or ceramic surface an aqueous coating composition which has a shelf-life of at least about ten months, which does not contain chromium, which has a pH of about 10 to about 14, which is capable of forming on the surface a corrosion-resistant coating, and which consists essentially of an aqueous liquid phase including about 35 to about 70 wt. % of water having dissolved therein about 2.5 to about 30 wt. % of lithium or sodium silicate or a mixture thereof and having dispersed therein about 20 to about 50 wt. % of solid aluminum particles of no greater size than about 15 microns, wherein the sodium silicate has a weight ratio of $SiO_2$ to $Na_2O$ of about 1.6 to 1 to about 3.75 to 1 and the lithium silicate has a weight ratio of $SiO_2$ to $Li_2O$ of about 9.4 to 1 to about 17 to 1, to form on the surface a wet coating; and (B) drying said wet coating: (i) under conditions which convert said wet coating to an electrically conductive, corrosion-resistant, solid coating; or (ii) under conditions which form a solid coating which is not electrically conductive (non-conductive) and thereafter treating said non-conductive coating under conditions which convert said non-conductive coating to an electrically conductive, corrosion-resistant coating; a corrosion-resistant coating as referred to herein being such that a coating which has a thickness of about 0.8 mil to about 3.5 mils has corrosion-resistant properties that are characterized by no greater than about 1.6 mm loss of adhesion at scribe when subjected to 5% neutral salt spray at 95° F. for about 1000 hours according to ASTM B-117.

2. A process according to claim 1 wherein the surface is metallic and forming on the surface a coating which has a thickness of about 0.8 mil to about 3.5 mils.

3. A process according to claim 2 wherein said wet coating is dried under said conditions of (i).

4. A process according to claim 2 wherein said wet coating is dried under said conditions of (ii).

5. A process according to claim 4 including burnishing the non-conductive coating for a sufficient period of time to convert it to a conductive coating.

6. A process according to claim 2 wherein the coating composition is applied to the metallic surface of a part of a turbine engine.

7. A process for converting a solid lithium and/or sodium silicate coating that contains aluminum particles and that is formed from an aqueous composition which consists essentially of about 35 to about 70 wt. % water and has an aqueous liquid phase, which has a pH of about 10 to about 14, which has a shelf-life of at least about ten months, which contains dissolved in the liquid phase about 2.5 to about 30 wt. % of lithium and/or sodium silicate, wherein the sodium silicate has a weight ratio of $SiO_2$ to $Na_2O$ of about 2.5 to 1 to about 3.2 to 1 and the lithium silicate has a weight ratio of $SiO_2$ to $Li_2O$ of about 9 to 1 to about 10 to 1, which contains about 20 to about 50 wt. % of solid aluminum particles of a size no greater than about 15 microns dispersed therein, and which does not contain chromium, said coating being adhered to a metallic or ceramic surface and not being electrically conductive (non-conductive), in which said coating is converted to a conductive, corrosion-resistant coating by: (A) subjecting the non-conductive coating to elevated temperature conditions which effect expansion of the aluminum particles to place them into intimate contact with one another to the extent that the coating is rendered electrically conductive and corrosion-resistant; or (B) subjecting the non-conductive coating to a force which is sufficient to compress the particles into more intimate contact with one another to the extent that the coating is rendered electrically conductive and corrosion-resistant; a corrosion-resistant coating as referred to herein being such that a coating which has a thickness of about 0.8 mil to about 3.5 mils has corrosion-resistant properties that are characterized by no greater than about 1.6 mm loss of adhesion at scribe when subjected to 5% neutral salt spray at 95° F. for about 1000 hours according to ASTM B-117.

8. A process for forming a multi-ply coating on a metallic or ceramic surface by applying thereto an aqueous coating composition which has a pH of about 10 to about 14, which does not contain chromium, which has a shelf-life of at least about 10 months, which is capable of forming on the surface a corrosion-resistant coating, and which consists essentially of an aqueous liquid phase containing about 35 to about 70 wt. % water and having dissolved therein about 2.5 to about 30 wt. % of lithium or sodium silicate or a mixture thereof, wherein the sodium silicate has a weight ratio of $SiO_2$ to $Na_2O$ of about 1.6 to 1 to about 3.75 to 1 and the lithium silicate has a weight ratio of $SiO_2$ to $Li_2O$ of about 9.4 to 1 to about 17 to 1, and having dispersed therein about 20 to about 50 wt. % of solid aluminum particles of a size no greater than about 15 microns, and in which: (A) the composition is applied to the surface to form thereon a layer of wet coating; and (B) the layer of wet coating is air-dried; (C) the composition is applied to the surface of the air-dried coating to form thereon an overlying layer of wet coating; and (D) said overlying layer of wet coating is (i) dried under conditions which convert said wet coating to an electrically conductive, solid corrosion-resistant multi-ply coating or (ii) said wet coating is dried under conditions which form a solid multi-ply coating which is not electrically conductive (non-conductive) and said non-conductive multi-ply coating is thereafter treated under conditions which convert said non-conductive coating to an electrically conductive, corrosion-resistant, multi-ply coating; a corrosion-resistant coating as referred to herein being such that a coating which has a thickness of about 0.8 mil to about 3.5 mils has corrosion-resistant properties that are characterized by no greater than about 1.6 mm loss of adhesion at scribe when subjected to 5% neutral salt spray at 95° F. for about 1000 hours according to ASTM B-117.

9. A process according to claim 8 wherein the surface is steel.

10. A process according to claim 9 wherein the coating composition includes lithium silicate and wherein the weight ratio of $SiO_2$ to $Li_2O$ is within the range of about 9 to 1 to about 10 to 1.

11. A process according to claim 9, wherein the composition has a pH of about 11.5 to about 12.5 and includes said mixture of lithium and sodium silicates, wherein the aluminum particles have an average size of about 4 to about 7 microns, wherein the multi-ply coating is a two-ply coating, wherein said overlying wet coating is treated according to step (D)(ii) and includes burnishing the coating.

12. A process according to claim 11 wherein the two-ply coating has a thickness of about 0.8 mil to about 3.5 mils.

13. A metallic or ceramic surface coated with an electrically conductive, corrosion-resistant coating which does not contain chromium and which is formed from an aqueous composition which consists essentially of about 35 to about 70 wt. % water and has an aqueous liquid phase, which does not contain chromium, which has a shelf-life of at least about 10 months, which has a pH of about 10 to about 14 and which has about 20 to about 50 wt. % of aluminum in solid particle form which has a particle size of no greater than about 15 microns dispersed within the liquid phase, and which has about 2.5 to about 30 wt. % of lithium and/or sodium silicate dissolved in the phase; wherein the sodium silicate has a weight ratio of $SiO_2$ to $Na_2O$ of about 2.5 to 1 to about 3.2 to 1 and the lithium silicate has a weight ratio of $SiO_2$ to $Li_2O$ of about 9 to 1 to about 10 to 1, a corrosion-resistant coating as referred to herein being such that a coating which has a thickness of about 0.8 mil to about 3.5 mils has corrosion-resistant properties that are characterized by no greater than about 1.6 mm loss of adhesion at scribe when subjected to 5% neutral salt spray at 95° F. for about 1000 hours according to ASTM B-117.

14. A steel surface according to claim 13 wherein the coating has a thickness of about 0.8 mil to about 3.5 mils.

15. A steel surface according to claim 14 wherein said coating has heat-resistant properties characterized by its being substantially free of cracks, checks, and blisters when the surface is subjected to the following conditions:
heat treatment for 23 hours at a temperature of about 700° F., followed by heat treatment for 4 hours at a temperature of about 1075° F.

16. A steel surface according to claim 14 wherein said coating has flexibility properties characterized by its being substantially free of flaking or loosening when subjected to the following conditions: bending a panel coated with the coating through an angle of 90° around a ¼ inch diameter mandrel.

17. A steel surface according to claim 14 wherein said coating has hydraulic oil-resistant properties characterized by its being free of peeling, blistering, or softening when the part is subjected to the following conditions: immersion in Mil-L-7808 oil for 8 hours at a temperature of about 400° F.

18. A coating composition which does not contain chromium, which has a shelf-life of at least about ten months, which is effective in forming on a metallic or ceramic surface a corrosion-resistant coating, which has a pH of about 10 to about 14, and which consists essentially of (a) an aqueous liquid phase containing about 35 to about 70 wt. % water, about 2.5 to about 30 wt. % of lithium or sodium silicate or a mixture thereof, wherein the sodium silicate has a weight ratio of $SiO_2$ to $Na_2O$ of about 1.6 to 1 to about 3.75 to 1 and the lithium silicate has a weight ratio of $SiO_2$ to $Li_2O$ of about 9.4 to 1 to about 17 to 1, (b) which has dispersed therein about 20 to about 50 wt. % of solid aluminum particles of no greater size than about 15 microns, and (c) which includes an additive that is effective in improving the corrosion-resistance of the coating and that is selected from the group consisting of (i) an organic solvent which is partially miscible or immiscible in water; (ii) and an organofunctional silane, and (iii) a mixture of said additives; a corrosion-resistant coating as referred to herein being such that a coating which has a thickness of about 0.8 mil to about 3.5 mils has corrosion-resistant properties that are characterized by no greater than about 1.6 mm loss of adhesion at scribe when subjected to 5% neutral salt spray at 95° F. for about 1000 hours according to ASTM B-117.

19. A composition according to claim 18 wherein the additive is an organic solvent which has a miscibility in water of about 1 ml to about 20 ml of solvent per 100 ml of water at about 20° C.

20. A composition according to claim 19 wherein the solvent has a miscibility in water of up to about 10 ml.

21. A composition according to claim 20 wherein the solvent has a miscibility in water of up to about 5 ml.

22. A composition according to claim 18 including also an organic or inorganic phosphate-containing compound.

23. A composition according to claim 22 including sodium pyrophosphate.

24. A composition according to claim 18 including dipropylene glycol n-butyl ether organic solvent.

25. A composition according to claim 18 including an organoreactive silane.

26. A composition according to claim 25 including N-beta-(aminoethyl)-gamma-aminopropyltrimethoxysilane or gamma glycidoxypropyltrimethoxysilane.

27. A composition according to claim 18 including as a wetting agent polyether modified poly-dimethyl-siloxane.

28. A composition according to claim 18 wherein said weight ratio of $SiO_2$ to $Na_2O$ is within the range of about 2.5 to 1 to about 3.2 to 1 and said weight ratio of $SiO_2$ to $Li_2O_2$ is within the range of about 9 to 1 to about 10 to 1.

29. An aqueous coating composition which does not contain chromium, which has a pH of about 10 to about 14, which has a shelf-life of at least about ten months, and which is effective in forming a corrosion-resistant coating on a metallic or ceramic surface and which consists essentially of about 35 to about 70 wt. % water and has about 20 to about 50 wt. % aluminum particles of a size no greater than about 15 microns dispersed in the composition and, dissolved therein, a mixture of sodium silicate and lithium silicate, the total silicate content of the composition being about 2.5 wt. % to about 30 wt. % and the weight ratio of sodium silicate to lithium silicate being about 0.25 to 1 to about 4 to 1, and wherein the sodium silicate has a weight ratio of $SiO_2$ to $Na_2O$ of about 2.5 to 1 to about 3.2 to 1 and the lithium silicate has a weight ratio of $SiO_2$ to $Li_2O$ of about 9 to 1 to about 10 to 1; a corrosion-resistant coating as referred to herein being such that a coating which has a thickness of about 0.8 mil to about 3.5 mils has corrosion-resistant properties that are characterized by no greater than about 1.6 mm loss of adhesion at scribe when subjected to 5% neutral salt spray at 95° F. for about 1000 hours according to ASTM B-117.

30. A composition according to claim 29 wherein the total silicate content of the composition is about 7 wt. % to about 13 wt. %.

31. A coating composition having a shelf-life of at least about ten months and: (A) which does not contain chromium; (B) which is effective in forming on a metallic surface a corrosion-resistant coating; (C) which has a pH of about 10 to about 14; and (D) which consists essentially of lithium or sodium silicate or a mixture thereof dissolved in an aqueous liquid phase of the composition which contains about 25 to about 70 wt. % water and having dispersed therein solid aluminum particles; and which includes:
  (1) about 2.5 to about 30 wt. % of lithium or sodium silicate or a mixture thereof; and wherein the sodium silicate has a weight ratio of $SiO_2$ to $Na_2O$ of about 1.6 to 1 to about 3.75 to 1 and the lithium silicate has a weight ratio of $SiO_2$ to $Li_2O$ of about 9.4 to 1 to about 17 to 1,
  (2) about 20 to about 50 wt. % of aluminum particles having an average size of no greater than about 15 microns; a corrosion-resistant coating as referred to herein being such that a coating which has a thickness of about 0.8 mil to about 3.5 mils has corrosion-resistant properties that are characterized by no greater than about 1.6 mm loss of adhesion at scribe when subjected to 5% neutral salt spray at 95° F. for about 1000 hours according to ASTM B-117.

32. A composition according to claim 31 wherein (1) content of the silicate or mixture thereof is about 7 to about 13 wt. %; and wherein (2) the content of the aluminum particles is about 35 to about 45 wt. % and are in the form of a powder and have which has an average particle size within the range of about 2 to about 10 microns.

33. A composition according to claim 32 wherein the average particle size of the aluminum is within the range of about 4 to about 7 microns.

34. A composition according to claim 31 including said mixture and wherein the weight ratio of $SiO_2$ to $Na_2O$ is within the range of about 2.5 to 1 to about 3.2 to 1 and the weight ratio of $SiO_2$ to $Li_2O_2$ is within the range of about 9 to 1 to about 10 to 1.

35. A composition according to claim 31 which has a pH of about 11.5 to about 12.5.

36. A composition according to claim 31 including sodium silicate which comprises about 9 to about 27 wt. % $Na_2O$ and about 20 to about 75 wt. % $SiO_2$.

37. A composition according to claim 31 including about 2.5 to about 30 wt.% of sodium silicate in which the weight ratio of $SiO_2$ to $Na_2O$ is within the range of about 2.5 to 1 to about 3.2 to 1.

38. A composition according to claim 37 in which the sodium silicate comprises about 9 to about 27 wt.% $Na_2O$ and about 20 to about 75 wt.% $SiO_2$.

39. A composition according to claim 37 including about 7 to about 13 wt.% sodium silicate which comprises about 9 to about 27 wt.% $Na_2O$ and about 20 to about 75 wt.% $SiO_2$.

40. A composition according to claim 39 in which the content of aluminum particles is about 35 to 45 wt.%, the particles being in the form of a powder and having an average particle size of about 2 to about 10 microns and the water content of the composition being about 45 to about 55 wt.%.

\* \* \* \* \*